United States Patent
Hutz et al.

(10) Patent No.: US 9,647,890 B1
(45) Date of Patent: May 9, 2017

(54) MESH NETWORK RESILIENCY

(71) Applicant: Alarm.com Incorporated, Tysons, VA (US)

(72) Inventors: David James Hutz, Herndon, VA (US); Matthew Flannery Knight, Boston, MA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/249,868

(22) Filed: Aug. 29, 2016

Related U.S. Application Data

(63) Continuation of application No. 14/216,204, filed on Mar. 17, 2014, now Pat. No. 9,432,259.

(60) Provisional application No. 61/790,493, filed on Mar. 15, 2013.

(51) Int. Cl.
*H04L 12/24* (2006.01)
*H04L 12/751* (2013.01)
*H04L 12/28* (2006.01)

(52) U.S. Cl.
CPC ........ *H04L 41/0836* (2013.01); *H04L 12/283* (2013.01); *H04L 45/02* (2013.01)

(58) Field of Classification Search
None
See application file for complete search history.

(56) References Cited

U.S. PATENT DOCUMENTS

| | | |
|---|---|---|
| 8,509,923 B2 | 8/2013 | Koskan |
| 8,768,265 B2 | 7/2014 | Folden |
| 2010/0082513 A1 | 4/2010 | Liu |
| 2010/0204847 A1 | 8/2010 | Leete, III |
| 2010/0329260 A1 | 12/2010 | Kim |
| 2011/0188419 A1 | 8/2011 | Filoso |
| 2012/0256733 A1 | 10/2012 | Carr |
| 2012/0324273 A1 | 12/2012 | Shaffer |
| 2013/0137378 A1 | 5/2013 | Folden |
| 2014/0085105 A1 | 3/2014 | Vaswani |
| 2014/0126392 A1 | 5/2014 | George |

*Primary Examiner* — Diane Lo
(74) *Attorney, Agent, or Firm* — Fish & Richardson P.C.

(57) ABSTRACT

Mesh network resiliency technology, in which a first routing configuration for nodes of a mesh network is determined, the first routing configuration being appropriate when a first power source of the mesh network is available. Routing data that indicates routing responsibilities within the first routing configuration is provided to first nodes of the mesh network. An interruption of the first power source for the mesh network is detected by nodes of the mesh network. In response to detecting the interruption, a second routing configuration for nodes of the mesh network is determined, the second routing configuration being appropriate when the first power source of the mesh network is unavailable. Routing data that indicates routing responsibilities within the second configuration is provided to second nodes of the mesh network, each of the second nodes including a second power source that is different than the first power source.

20 Claims, 4 Drawing Sheets

MESH NETWORK RESILIENCY

CROSS REFERENCE TO RELATED APPLICATIONS

This application is a continuation (and claims the benefit of priority under 35 USC 120) of U.S. application Ser. No. 14/216,204, filed Mar. 17, 2014, now allowed, which claims the benefit of U.S. Provisional Application No. 61/790,493, filed Mar. 15, 2013. Both of these prior applications are incorporated by reference in their entirety.

TECHNICAL FIELD

This disclosure relates to mesh network resiliency during power outages.

BACKGROUND

Mesh networks are becoming increasingly common and increasingly important for home monitoring and home automation. These networks may include a mixture of battery-powered nodes, AC-powered nodes, nodes that are AC-powered with battery backups, and nodes that are AC-powered with uninterruptable power supplies. Currently, mesh networks that are typically utilized in applications of home monitoring and home automation are not configured to respond effectively to AC power failures.

SUMMARY

Techniques described herein relate to mesh network resiliency during power outages.

Implementations of the described techniques may include hardware, a method or process implemented at least partially in hardware, or a computer-readable storage medium encoded with executable instructions that, when executed by a processor, perform operations relating to the described techniques.

The details of one or more implementations are set forth in the accompanying drawings and the description. Other features will be apparent from the description and the drawings.

DETAILED DESCRIPTION

Figure 1:
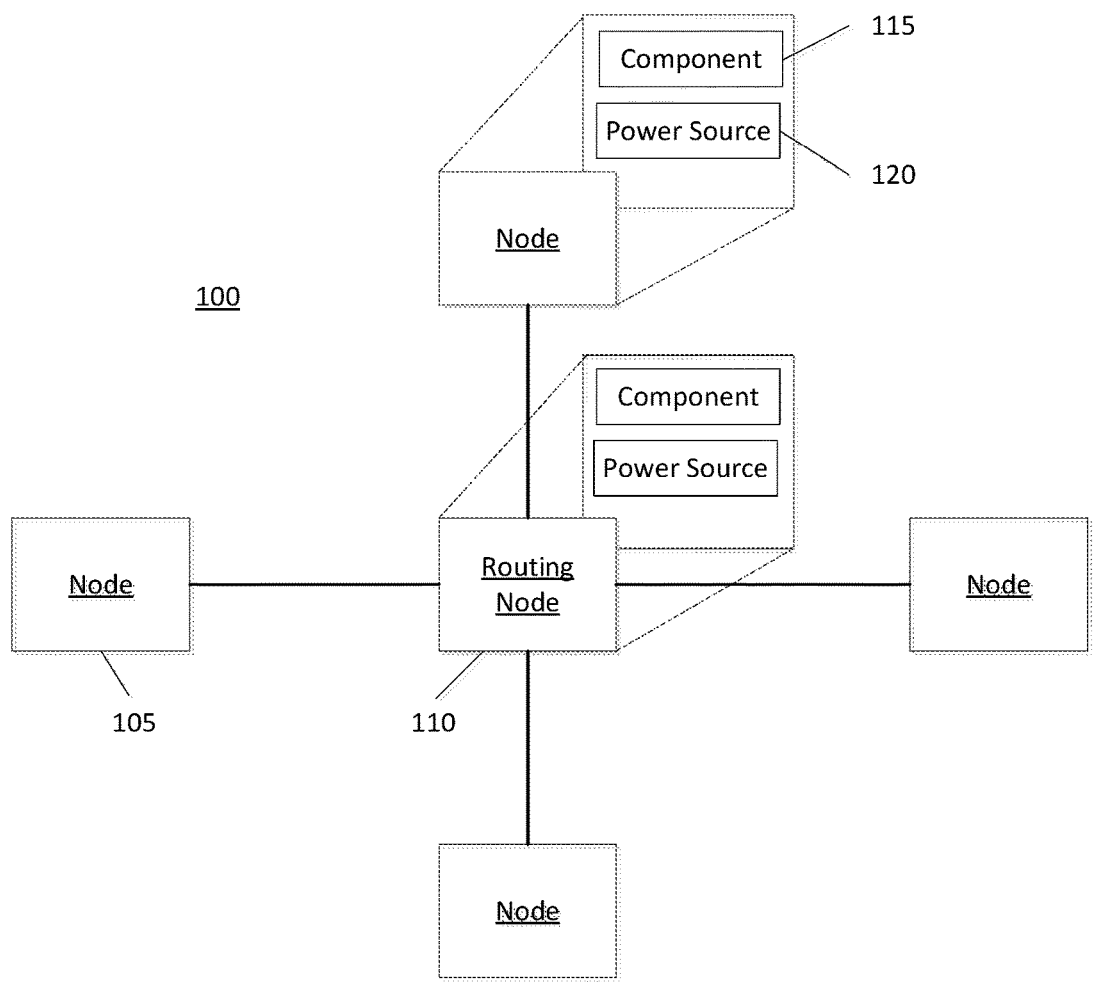
FIG. 1 illustrates an example system.

Techniques are described for addressing mesh network resiliency during power outages. FIG. 1 illustrates an example of a mesh network that may be used, for example, in a home monitoring or home automation system. A system may include a mesh network 100 configured to perform functions associated with at least one component of the system. The mesh network 100 may include at least one interacting node 105 and at least one routing node 110. Each interacting node 105 and routing node 110 may be associated with one or more components 115 of a home monitoring or home automation system, or any combination of interacting nodes 105 and routing nodes 110 may be associated with any component 115 of the system. Functionally, one or more of interacting nodes 105 may be the same or similar in design and/or capability as one or more routing nodes 110 and one or more interacting nodes 105 may be different in design and/or capability as one or more routing nodes 110. In implementations in which some or all of the interacting nodes 105 are the same or similar in design and/or capability of the routing nodes 110, one or more interacting nodes 105 may be designated or identified as one or more routing nodes 110, and one or more routing nodes 110 may be designated or identified as interacting nodes 105. Accordingly, in some implementations, the set of one or more interacting nodes 105 includes the set of one or more routing nodes 110.

Each of the interacting nodes 105 and routing nodes 110 may communicate or otherwise transfer data to one or more interacting nodes 105 and/or routing nodes 110 through one or more routing nodes 110 that overall constitute a mesh network 100. Communication or data transfer in the mesh network 100 may occur by any wired or wireless method or protocol, including, for example, an Ethernet network, public switched telephone network (PSTN), power line network, local area network (LAN), wireless local area network (WLAN), Bluetooth, Z-Wave, ZigBee, INSTEON, local wireless 900 MHz communication band, 6LoWPAN, etc. Each interacting node 105 and/or routing node 110 includes an association with at least one component 115 of the home monitoring or home automation system, as well as at least one power source 120, where the power source may comprise an AC power source, a battery power source, an AC power source with battery backup, an AC power source with external uninterruptable power supply, or any other power source or combination of power sources. Components 115 of the home monitoring or home automation system may include, for example, one or more security panels, door locks, window locks, cameras, video cameras, motion sensors, temperature sensors, noise sensors, humidity sensors, or any other detection, monitoring, or actuation device, as well as any of one or more switches, control panels, thermostats, sump pumps, or other home appliance or utility control devices.

According to some implementations, a determination may be made as to which nodes of a mesh network 100 are equipped with backup power sources and/or what type of backup power sources nodes are equipped with, for example, battery backup sources or external uninterruptable power supplies. In some examples, the determination may be made by an installer of a mesh network 100 at the time of system installation and received as input by a component of the mesh network, for example, at the time when a home monitoring or home automation system is installed. Such an implementation may be problematic, as an installer may inappropriately indicate which nodes of a mesh network 100 are equipped with backup power sources, and/or what types of backup power sources various nodes of the mesh network 100 are equipped with.

As an alternative to manually indicating whether certain nodes of a mesh network 100 are equipped with backup power sources and/or what type of backup power sources the nodes are equipped with, the system may initiate a whole system AC power failure, subsequently restore AC power, and determine if each node ceased operating during the power failure. For example, a whole-home power failure of a home monitoring or home automation system can be initiated by switching a main circuit breaker for the system, subsequently restoring power to the main circuit, and querying the uptime for each node of the mesh network 100. In such an implementation, nodes that have been functional since before the power failure may be identified as battery powered nodes or nodes equipped with a battery backup power source. By using such an approach, the system may have a greater confidence level regarding the type of power source and/or backup power source each node of mesh network 100 is equipped with.

In some examples, resiliency of a mesh network 100 is achieved by configuring the network in such a manner that only those nodes that are equipped with an AC power source and a battery backup power source are designated as routing nodes 110. In such an implementation, one or more nodes of mesh network 100 that are equipped with a battery backup power source are designated as routing nodes 110 of the mesh network 100 of the home monitoring or home automation system. Interacting nodes 105 that are not equipped with a battery backup power source, for example those nodes that are only powered by an AC power source without a backup and/or nodes equipped only with battery power sources, may not be designated as routing nodes 110.

During a power failure, routing nodes 110 of mesh network 100 may utilize backup power sources in order to continue signal routing during the power failure. According to some implementations, routing nodes 110 may automatically engage a backup power source in order to maintain functionality of the routing nodes 110 during the power failure, and may automatically disengage the backup power source upon detecting an end of the power failure (e.g., when an AC power source is restored). By utilizing only nodes equipped with both an AC power source and a battery backup power source as routing nodes 110, communication or data transfer in the mesh network 100 can be maintained during a power failure to nodes of mesh network 100 that are equipped with a battery power source and/or that are equipped with an AC power source and a backup power source, for example, a battery backup power source or external uninterruptable power supply.

Additionally, in some implementations, nodes of the mesh network 100 can enter a reduced power state based on determining that a power failure has occurred. For example, based on determining that a power failure has occurred, data can be transmitted to one or more nodes of the mesh network 100 that cause the nodes of the mesh network 100 to enter a reduced power operating mode. By operating under a reduced power mode, the nodes of the mesh network 100 may extend the amount of time that the nodes can operate using backup power sources. For example, one or more nodes of the mesh network 100 that are equipped with a battery power source and/or that are equipped with an AC power source and a battery backup power source can enter a reduced power operating mode in order to extend the life of the battery power source and/or battery backup power source during a power failure. In some instances, all or a subset of the nodes of the mesh network 100 can enter a reduced power mode, for instance, one or more routing nodes 110 of the mesh network 100 and/or one or more interacting nodes 105 of the mesh network 100.

A mesh network 100 associated with a home monitoring or home automation system may be configured at the time of installation in such a manner that only nodes that feature an AC power source and a battery backup power source are utilized as routing nodes 110. According to some implementations, determining specific nodes to utilize as routing nodes 110 may be performed by an installer of a system, such as a home monitoring or home automation system, since the interacting nodes 105 of mesh network 100 would not be capable of detecting the presence of a battery backup power source during operation. In such an implementation, the designated routing nodes 110 of mesh network 100 may be the routing nodes 110 of the mesh network 100, both when a system power state is a state in which an AC power source is available and when the system power state is a state in which an AC power source is not available.

In some implementations, the routing nodes 110 of the mesh network 100 store multiple (e.g., two or more) sets of routing configurations at all times. In these implementations, the sets of routing configurations may be ranked and a routing node may attempt to use the highest ranked routing configuration first in attempting to send a communication in the mesh network 100. If the highest ranked routing configuration fails, the routing node cycles through the other routing configurations in accordance with the rankings until the communication is successful or all routing configurations have been attempted without success. For example, the routing nodes 110 of the mesh network 100 may store a primary routing configuration and a secondary routing configuration. In this example, when the primary routing configuration fails, the routing nodes 110 of the mesh network 100 automatically switch to the secondary routing configuration upon detecting the failure. By switching between routing configurations upon failure, the routing nodes 110 may not have to detect power failures reliably and may be able to respond to other types of failures.

According to another innovative feature of the described subject matter, the system of mesh network 100 may be programmed with a set of two routing topologies and may be capable of detecting a power failure and/or power restoration in mesh network 100. Using power detection capabilities, a system may be programmed to recognize two system states of mesh network 100, a first state associated with an availability of AC power, and a second state associated with an AC power failure. To enhance mesh network resiliency during a power failure event, the mesh network 100 may be configured in such a way that, when AC power is available to the system, the mesh network 100 implements a first routing mode associated with the first system state and a first network routing topology, and when mesh network 100 detects that AC power is not available to the system, the mesh network 100 implements a second, different routing mode associated with the second system state and a second, different network routing topology. According to some implementations, a first routing mode associated with the first system state and the first routing topology may utilize only nodes equipped with an AC power supply and/or nodes equipped with an AC power supply and a battery backup power source as routing nodes 110. In these implementations, a second routing mode associated with the second system state and the second routing topology may utilize only nodes equipped with a battery power source and/or a battery backup power source as routing nodes 110.

Upon detecting a change of state in the system of mesh network 100, the system operating in one of the two routing modes may, in response to detecting the change of state, switch the operating mode of the system to the other operating mode of the system. For example, a mesh network 100 operating under a system state in which AC power is available and thus is using a first routing mode may, upon detecting a power failure, determine that the system is now in the second system state, and, in response to detecting the change of state, switch the routing mode to a second routing mode. Similarly, the system of some implementations operating under the second system state in which AC power is not available and thus using a second routing mode may, upon detecting a restoring of AC power, determine that the system is now in the first system state, and, in response to detecting the change of state, switch the routing mode to a first routing mode.

To determine that a change of system state has occurred, the system may use one or more methods to determine that a change has taken place and that the routing mode of mesh network 100 should also be changed. According to some implementations, one node of the interacting nodes 105 within mesh network 100 may be utilized for determining that a system state change has occurred and for initiating a process to change the routing mode of mesh network 100. In some instances, the node delegated to perform these operations may be termed a "coordinator node" and may perform these operations exclusively or perform these operations in addition to other operations. For example, the coordinator node may be an interacting node 105 of the system that is also a routing node 110, or may be an interacting node 105 that is not a routing node 110 but that is able to communicate or transfer data to and from a routing node 110. In order to function as a coordinator node of mesh network 100, the interacting node 105 may be equipped with an AC power source with a battery backup power source. The coordinator node of mesh network 100 may also be capable of determining the AC power state within the system, e.g., it may not be an interacting node 105 equipped with an AC power source and an external uninterruptable power supply, as a node with an external uninterruptable power supply may not be capable of determining that changes in an AC power state have occurred, even when, for example, a power failure event has taken place. For applications in which the system is a home monitoring or home automation system, the mesh network 100 associated with the system may use an interacting node 105 at a security panel or control panel as the coordinator node, or may use any other interacting node 105 within the system that satisfies the criteria for a coordinator node.

Upon determining that a change of system state has occurred, the coordinator node of the mesh network 100 may initialize a change of routing mode of the mesh network 100 by, for example, sending a message or messages to one or more interacting nodes 105 and routing nodes 110. The message or messages sent by the coordinator node may be a common message for all interacting nodes 105 and routing nodes 110, may be a unique message for each of the interacting nodes 105 and routing nodes 110, or may be any combination of common and unique messages.

According to some implementations, a coordinator node may send a message or messages indicating that a system state has changed and that the routing mode of the system must also change in response to the change of system state. Additionally or alternatively, the message or messages sent to interacting nodes 105 and routing nodes 110 by the coordinator node may be a message that is specific to each of the interacting nodes 105 and routing nodes 110, for example, an indication that a specific interacting node 105 should function as a routing node 110, or should not function as a routing node 110.

The message or messages sent to the interacting nodes 105 and routing nodes 110 of mesh network 100 may, additionally or alternatively, indicate that certain interacting nodes 105 of mesh network 100 should not be routed to when the system is operating in a particular routing mode. For example, upon determining that a system state is a second system state in which AC power is not available, a coordinator node may send a message or messages to interacting nodes 105 and routing nodes 110 of mesh network 100 indicating that certain nodes should not be routed to for the particular routing mode. According to some implementations, such a message may be transmitted because some of the interacting nodes 105 and/or routing nodes 110 of mesh network 100 are not equipped with a backup power source, causing these nodes to be powered down during a system state in which AC power is not available. By avoiding routing to interacting nodes 105 that are not equipped with a backup power supply, the system may enable one or more routing nodes 110 that are operating on backup power supplies to operate for a longer period of time than if they routed to these nodes, by conserving power that would otherwise be used to route to nodes that are powered off.

In some implementations, the mesh network 100 uses "source routing" in which a sending node determines the full path to the destination node, not just the next hop. For instance, the mesh network 100 may be a z-wave network that uses source routing. In these implementations, a coordinator node (e.g., a node associated with a control panel) may be assigned and, if the coordinator node is able to determine a failure (e.g., a power failure) and has knowledge of alternative routes, the coordinator node may not need to update routing tables on all the other nodes in order to communicate with them. For example, to use an alternative routing configuration, the coordinator node may send a packet with the correct sequence of nodes for the alternative routing configuration. In this example, the routing nodes 110 (e.g., z-wave nodes) may reply back along the same route, and remember that route (temporarily) as the best route. Accordingly, the coordinator node may send a packet to each node along the alternative routing configuration (e.g., a routing configuration established to best maximize usage of battery-powered nodes) at the time of a power failure, and the other routing nodes 110 would all use the new routes automatically. Then, when the power is restored, the coordinator node may send a packet to each node along the primary routing configuration (e.g., a routing configuration established to best maximize usage of AC-powered nodes) to get the routing nodes 110 back into the primary routing configuration.

In another implementation, a mesh network 100 of a system can determine that a change of system state has occurred based on messages sent by more than one interacting node 105 within mesh network 100 and can utilize a voting process to determine if a change of routing mode should be initialized. According to some implementations, mesh network 100 can again be programmed with a set of two potential routing topologies: a first routing topology associated with a first system state in which AC power is available, and a second routing topology associated with a second system state in which AC power is not available. In some instances, each interacting node 105 or routing node 110 that detects a change of state within the system, for example a power failure event or a power restoration event, can broadcast that detection by sending one or more messages within mesh network 100. Each interacting node 105 equipped with an AC power source and a battery backup source can then, in some instances and in response to receiving a change of state message from one or more interacting nodes 105 and/or routing nodes 110, detect whether a change of state has occurred, and if that node does not detect a change of state, can subsequently broadcast a message indicating that fact. Based on the messages sent and received by interacting nodes 105 and/or routing nodes 110 of mesh network 100, the mesh network 100 can utilize a voting process to determine a consensus on whether the routing mode of the system should be changed.

For example, a mesh network 100 operating in a first routing mode associated with a system state in which AC power is available may experience a power failure event. In response to the power failure event, interacting nodes 105 and routing nodes 110 of mesh network 100 that are capable of functioning without AC power (e.g., using a backup power source) may then transmit one or more messages indicating that a power failure event has been detected. In response to receiving one or more messages indicating that a power failure event has occurred, AC powered nodes with battery backup power sources may determine if a power failure event has occurred, and if one such node does not detect a power failure event, may transmit one or more messages indicating that a power failure event has not been detected by that node. A voting process can then utilize information from the messages and, based upon the messages, determine if the system should respond to the detected power failure event, for example, by switching the routing mode of the mesh network 100 to a second routing mode associated with a second system state in which AC power is not available.

According to some implementations, the voting process may additionally consider a lack of messages from interacting nodes 105 and/or routing nodes 110 that are not equipped with backup power sources in the event of a change of system state. For example, interacting nodes 105 that are equipped only with an AC power source may not be capable of transmitting a message indicating a power failure in the event of such a failure. In these instances, a voting process may consider the lack of messages received from these nodes as an indication that a power failure event may have occurred, and utilize this in determining a consensus and a system response.

Using a voting process method as described, the system may, when switching routing modes from one routing mode to a different routing mode, temporarily become a disjointed mesh network until the switching has been completed. For example, a mesh network 100 operating in a first routing mode may utilize a routing topology in which at least some routing nodes 110 are AC powered nodes or AC powered nodes with a power source backup. The mesh network 100 may then determine that a power failure event has occurred and may initialize a process to switch the routing mode of the system to a second routing mode and a second routing topology in which at least some routing nodes 110 are battery powered nodes or AC powered nodes with backup power sources. During the process of switching from the first routing mode to the second routing mode, mesh network 100 may temporarily become a disjointed mesh network until the switching process has been completed, when the system will then operate in the second routing mode.

According to another innovative feature of the subject matter described herein, a system such as a home monitoring or home automation system comprising a mesh network 100 may be capable of dynamically rediscovering potential mesh network topologies upon detecting a change of system state. As described, the system may be capable of detecting a power state of the system. For example, one or more interacting nodes 105 and/or routing nodes 110 of mesh network 100 may be capable of detecting if AC power is available or if AC power is not available to the system. Upon detecting a change of system state or any other event that impacts routing within mesh network 100, mesh network 100 may dynamically change the routing of mesh network 100, for example, in order to maintain routing within mesh network 100. According to some implementations, dynamic rerouting of mesh network 100 may occur by rebuilding a routing table that dictates how routing is accomplished within mesh network 100.

The system may benefit from a mesh network 100 that is capable of dynamic network rerouting by avoiding additional pre-programming at the time of installation of the system, where the system may be a home monitoring or home automation system. Avoiding such pre-programming may be beneficial by, for example, reducing the amount of effort required to configure the system at the time of installation. Additionally or alternatively, avoiding preprogramming of the system may be beneficial by avoiding errors that may occur in the programming of mesh network 100 at the time of installation, for example, an error in programming one or more routing modes that results in the mesh network 100 not being able to route during a particular system state, or errors associated with properly determining the type of power source associated with one or more particular interacting nodes 105 and/or routing nodes 110.

In some instances, the mesh network 100 may be configured at times other than when a change of system power state is recognized, for example, at periodic or specific times, or when other changes are detected within the system, such as detecting that one or more interacting nodes 105 and/or routing nodes 110 are no longer functioning. The system may be capable of responding to such events by dynamically rediscovering the routing of mesh network 100 in order to maintain routing of the network. For example, in a system state in which AC power is not available, one or more interacting nodes 105 and/or routing nodes 110 utilizing battery power may stop functioning as the battery power sources are exhausted. In response to detecting that the one or more interacting nodes 105 and/or routing nodes 110 are no longer functioning, the system may respond by, for example, determining that the one or more interacting nodes 105 and/or routing nodes 110 are no longer functioning and may determine a new routing topology of mesh network 100.

In some instances, the mesh network 100 may be a large mesh network with many interacting nodes 105 and/or routing nodes 110. In such a system, it is reasonable to expect that performing dynamic network rediscovery may be a time consuming process or a process that utilizes considerable power and/or energy. As a result, according to some implementations, the use of dynamic network rediscovery may be best suited for smaller mesh networks, with other methods of mesh network routing and of maintaining mesh network resiliency being more efficient for larger networks. In such instances, a choice to utilize one method of routing may be made by the installer at the time of installation, or may be determined in any other way.

According to some implementations, the method of dynamic mesh network rediscovery may require that nodes be capable of determining a current system power state, for example, determining that a system is in an AC power available system state or an AC power unavailable system state. In order to determine the state of the system, the system may designate an interacting node 105 and/or routing node 110 of mesh network 100 as a coordinator node, where the coordinator node may be an AC powered node with a battery backup power source and where the coordinator node may be aware of the power state of the system. In such an instance, the coordinator node may operate as described above in order to determine a system power state and to initialize a dynamic rediscovery of potential mesh network topologies based on the determined power state. According to another implementation of the described system, the system may utilize a voting process and messages broadcast from one or more interacting nodes 105 and/or routing nodes 110 in mesh network 100, as described above, in order to determine a system power state and initialize a dynamic rediscovery of potential mesh network topologies based on the determined system power state.

According to some implementations, one or more interacting nodes 105 of mesh network 100 may be identified as interacting nodes 105 associated with critical components of the system. For example, a system comprising a mesh network 100 may be a home automation or a home monitoring system, and one or more interacting nodes 105 associated with door locks, sump pumps, or thermostats, to name a few, may be identified as critical interacting nodes 105 of the mesh network 100. In some instances, these nodes may be equipped with battery power sources, for example, they may be equipped only with battery power sources or with AC power sources and battery backup power sources. In order to avoid the interacting nodes 105 identified as critical nodes from depleting battery power sources and becoming non-functional, either during a system power state where AC power is available but the critical nodes still operate using battery power or during a system power state in which AC power is not available and the critical nodes are operating using backup battery power, the system may prevent and/or best avoid the use of interacting nodes 105 identified as critical nodes as routing nodes 110. According to some implementations, if a mesh network 100 is configured in such a way that the mesh network 100 become disjointed if an interacting node 105 identified as a critical node is not used as a routing node 110, the system may utilize the critical node as a routing node 110 by, for example, automatically or manually overriding the identification of the interacting node 105 as a critical node so that the node may operate as a routing node 110.

According to some instances, as systems of mesh networks 100 are installed and/or updated with new technologies, it is possible that mesh networks 100 may comprise interacting nodes 105 that are aware of the system power state (e.g., newer nodes) and other interacting nodes 105 that are not aware of the system power state (e.g., older nodes). In such an instance, it may be the case that pre-programming a mesh network 100 with two potential routing modes and switching between the routing modes in response to the system power state may not be a functional solution to responding to changes in the system power state.

In some instances, one of several approaches may be used to address changes in a system power state when a mesh network 100 is a mixed network of interacting nodes 105 that are capable of determining a power state and interacting nodes 105 that are not capable of determining a system power state.

According to some implementations, for example, systems may utilize mesh networks 100 that only utilize interacting nodes 105 equipped with AC power supplies and battery backups, as described.

Additionally or alternatively, according to some implementations, systems may utilize a mesh network 100 in which the interacting nodes 105 of the network are preprogrammed with a set of two potential routing modes, and use this method in combination with a method in which at least some interacting nodes 105 of mesh network 100 are capable of performing dynamic discovery of routing topologies. In such instances, a mesh network 100 may have interacting nodes 105 and/or routing nodes 110 that are capable of determining a system power state programmed with a set of two routing topologies for mesh network 100, associated with a first system state in which AC power is available and a second system state in which AC power is not available. The interacting nodes 105 and/or routing nodes 110 that are capable of determining a change of system state may then initialize the transmission of one or more messages to switch the operating mode of the mesh network to a different operating mode and/or may initialize a dynamic rediscovery of routing topologies within mesh network 100 in order to change routing within mesh network 100 to address the change of system power state.

Additionally or alternatively, according to some implementations, systems may utilize a mesh network 100 in which the interacting nodes 105 and/or routing nodes 110 of the network are capable of dynamically rediscovering routing topologies within network 100. In such an implementation, the system may utilize a coordinator node to determine that a system state change has occurred or may exclude interacting nodes 105 and/or routing nodes 110 that are not capable of determining a system power state from being considered by a voting process to determine if a system power state change has occurred. For example, a mesh network 100 featuring at least some interacting nodes 105 and/or routing nodes 110 that are capable of determining a system power state and at least some interacting nodes 105 and/or routing nodes 110 that are not capable of determining a system power state may designate one node that is capable of determining the system power state, and utilize that node as a coordinator node to determine the system power state, and depending upon the system power state and whether a change of system power state has occurred, may initialize a dynamic rediscovery of routing topologies within mesh network 100. According to another example, only interacting nodes 105 and/or routing nodes 110 of mesh network 100 that are capable of determining a system power state may, upon detecting a change of system power state, transmit one or more messages indicating that the node has detected a change of system power state, and one or more other messages may subsequently be sent and/or received, as described, in order to determine a consensus of whether a change of system power state has occurred. In response to the one or more messages sent by interacting nodes 105 and/or routing nodes 110, a voting process may determine that a system power state change has occurred, and may initialize a dynamic rediscovery of routing topologies within mesh network 100.

According to some implementations, some interacting nodes 105 and/or routing nodes 110 of a mesh network 100 may transmit unsolicited messages to one or more other interacting nodes 105 and/or routing nodes 110 within mesh network 100. In order to conserve power and/or energy, specifically for interacting nodes 105 and/or routing nodes 110 that are equipped only with battery power sources or are equipped with an AC power source and a battery backup power source that is used when the system is in a power state in which AC power is not available, the system may track (i) interacting nodes 105 and/or routing nodes 110 that are equipped with battery power sources (either exclusively or as backup power sources), and (ii) nodes that have not responded to or acknowledged previous messages. For example, the system may track interacting nodes 105 and/or routing nodes 110 that are believed to be failed nodes, wherein a failed node may be determined based on the node not responding to or acknowledging a prior message sent to the node. Based on certain interacting nodes 105 and/or routing nodes 110 being identified as nodes presently operating using battery power sources, the mesh network 100 may prevent messages from being sent to failed nodes, thus conserving the power and/or energy that may be required to send those messages to failed nodes. According to some implementations, a list of failed nodes may be created and updated, for example, during a prolonged power outage as nodes equipped with battery power sources exhaust their power supplies and become failed nodes.

According to some implementations, the system may attempt to avoid a transient node failure from disabling a node by identifying an interacting node 105 and/or routing node 110 of mesh network 100 as a failed node based on the node failing to respond to or acknowledge multiple, consecutive messages sent to the node. Additionally or alternatively, the system may attempt to send one or more messages to a node identified as a failed or potentially failed node, to ensure that the node was not a transiently failed node. For example, a system may attempt to send a message to an interacting node 105 identified as a failed node or a potentially failed node periodically (e.g., every 30 seconds), or may attempt to send a subset of messages (e.g., using 20% of messages) to the failed or potentially failed node. According to some implementations, if the interacting node 105 and/or routing node 110 identified as a failed or a potentially failed node responds to or acknowledges the one or more messages, the system may identify that the interacting node 105 is not a failed or potentially failed node.

Figure 2:
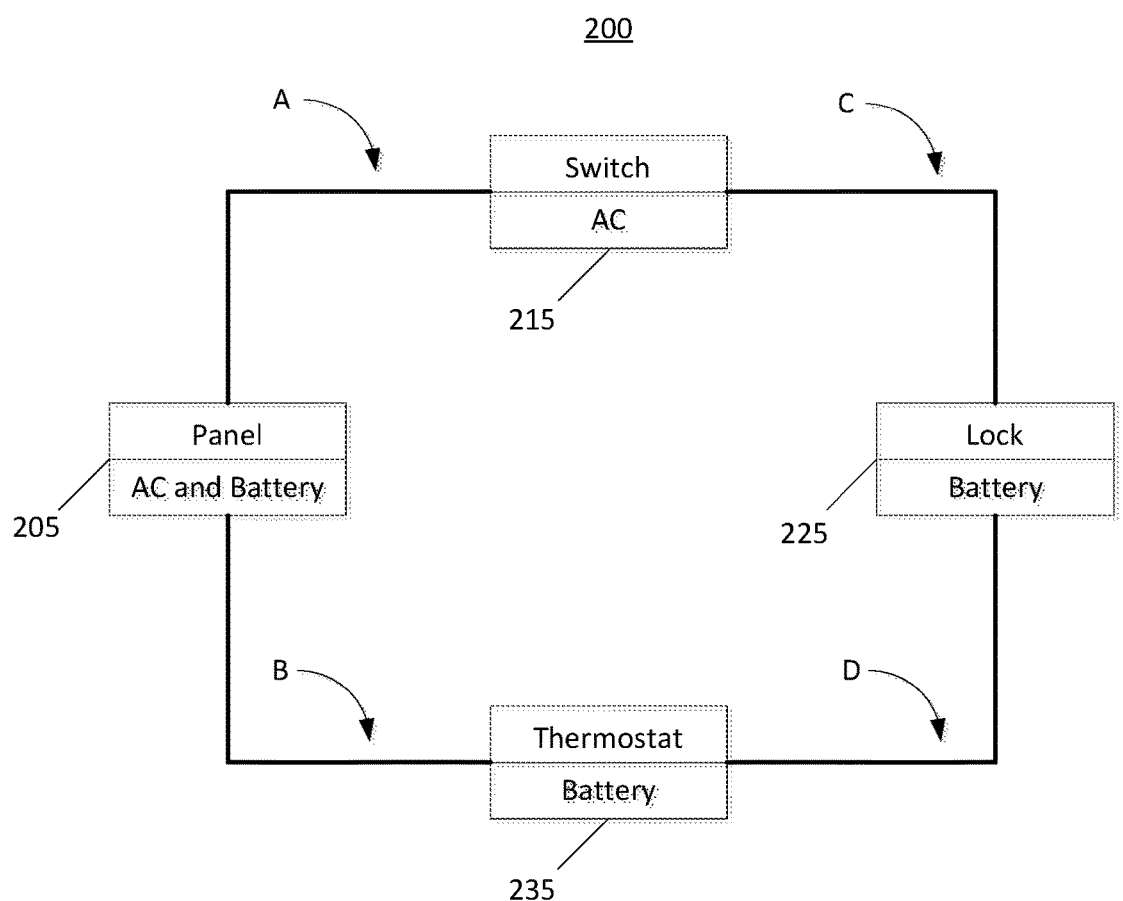
FIGS. 2-4 are diagrams illustrating examples of mesh network resiliency.

FIG. 2 illustrates an example routing implementation of a mesh network 200, in which the mesh network 200 may be related to a system for home monitoring or home automation. According to one example, the mesh network 200 of FIG. 2 can feature a routed network of nodes comprising nodes associated with a home monitoring or home automation control panel 205, switch 215, lock 225, and thermostat 235. The node 205 associated with a control panel may feature an AC power source with battery backup, the node 215 associated with a switch may feature only an AC power source, the node 225 associated with a lock may feature only a battery power source, and the node 235 associated with a thermostat may feature only a battery power source. Based on the example mesh network 200, routing topologies for each of three methods for addressing mesh network resiliency may be determined to enable data routing within the mesh network 200. For example, routing topologies for the mesh network 200 may enable data routing from the node 205 associated with the control panel to the node 225 associated with the lock, or from any other node of the mesh network 200 to another node of the mesh network 200.

Using a method of routing for mesh network 200 in which only nodes with an AC power source and a battery backup power source are utilized for routing, routing may only occur through node 205 associated with the control panel. For example, when AC power is available to the mesh network 200, node 205 may be used as a routing node to route data between nodes 215 and 235. That is, the data would travel through route A and route B. Node 225 associated with a lock would not be routed in such an implementation, as node 225 is not equipped with both an AC power source and a battery backup power source, therefore the route from node 215 through node 225, using routes C and D, would not be a valid data routing pathway. Furthermore, when the system is in a power state in which AC power is not available, routing may only occur using route B, since node 215 will not be functional, being equipped only with an AC power source, and since node 235 is not a valid routing node, being equipped with only a battery power source. In such an instance, nodes 215 and 225 will not be connected, since routes A, C, and D will not be valid routes of the mesh network 200.

Alternatively, mesh network 200 may be programmed with a set of two routing topologies and may be capable of determining the power state of mesh network 200. In this implementation, mesh network 200 may be programmed in such a way that when AC power is available to the mesh network 200, routing in mesh network 200 may occur through routes A, B, and C, since each of nodes 205, 215, and 235 is associated with an AC power source or battery power source. Since the node 225 associated with a lock may be identified as a critical node, and thus should not be used for routing when possible, the specific routing of mesh network 200 may be selected to exclude the node 225 from operating as a routing node. In addition, mesh network 200 may be programmed in such a way that, when the system determines that the mesh network 200 is in a state in which AC power is not available, routing in mesh network 200 may occur through routes B and D. Since node 215 associated with a switch is only AC powered, this node will not be active when mesh network 200 is in a state in which AC power is not available. Furthermore, since node 215 will not be active when AC power is absent, routing through node 225 provides no advantages, and therefore node 225 will not be designated as a routing node of the mesh network 200.

According to a third implementation, mesh network 200 may be capable of dynamically rediscovering potential mesh network topologies upon detecting a change of system state. In this implementation, mesh network 200 may be routed using any number of topologies while mesh network 200 is in a system state in which AC power is available. For example, when mesh network 200 has AC power available, data may be routed through routes A, B, C, and/or D. Upon determining that the mesh network 200 has entered a state in which AC power is not available, the mesh network 200 may dynamically reroute the mesh network 200. For example, a rediscovery process initialized based on determining that AC power to the mesh network 200 has been lost may determine that node 235 associated with the thermostat is a possible routing node and may route data through that node, for example, from node 205 to node 225 through routes B and D. The rediscovery process may further result in determining that node 215 is not functioning after the loss of AC power, and routing to or through node 215 may be eliminated, thereby invalidating routes A and C as possible routes within the mesh network 200.

Figure 3:
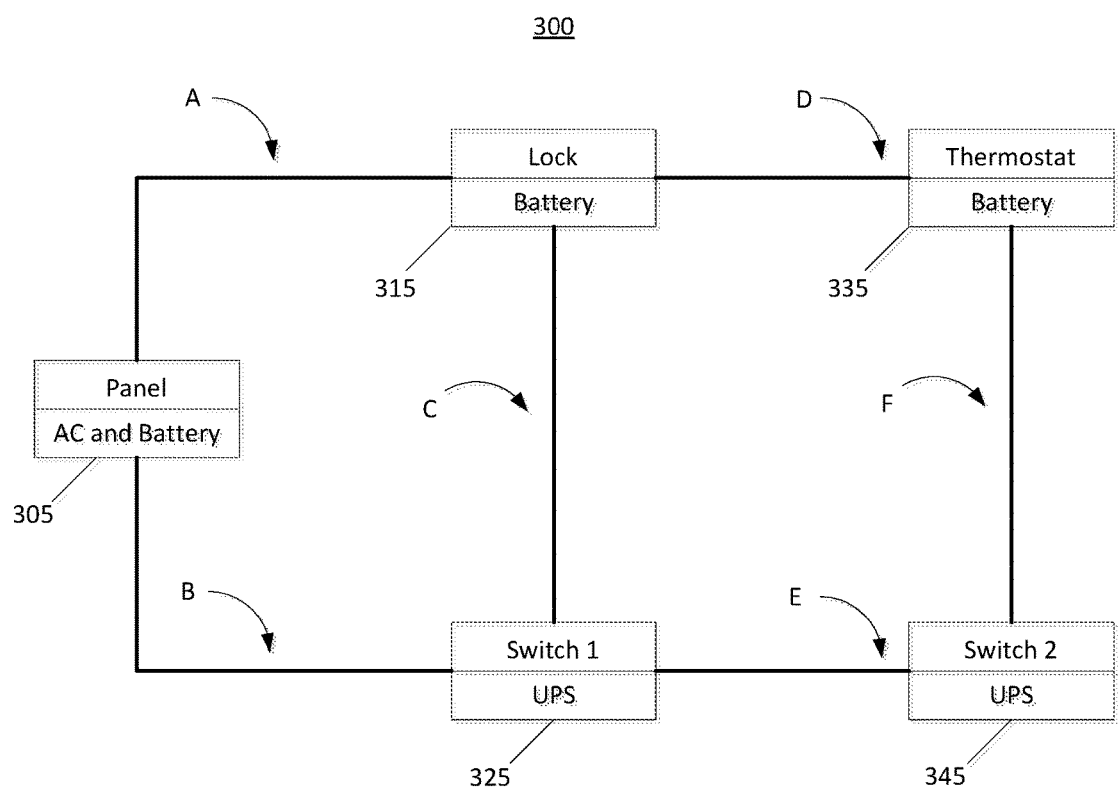

FIG. 3 illustrates an example routing implementation of a mesh network 300, in which the mesh network 300 may be related to a system for home monitoring or home automation. In some examples, the mesh network 300 of FIG. 3 can feature a routed network of nodes comprising nodes associated with a home monitoring or home automation control panel 305, a lock 315, a first switch 325, a thermostat 335, and a second switch 345. The node 305 associated with a control panel may feature an AC power source with battery backup, the node 315 associated with a lock may feature only a battery power source, the node 325 associated with a first switch may feature an AC power source with an external uninterruptable power supply, the node 335 associated with a thermostat may feature only a battery source, and the node 345 associated with a second switch may feature an AC power source with an external uninterruptable power supply. Based on the example mesh network 300, routing topologies addressing mesh network resiliency may be determined. For example, routing topologies may be determined that enable the node 305 associated with the control panel to communicate with any of nodes 315, 325, 335, or 345 of the mesh network 300.

For the mesh network configuration illustrated in FIG. 3, network routing may be configured to only route data through nodes with backup power sources and/or configured to only route data through nodes that do not perform vital functions. For example, the node 315 associated with a lock may be identified as a critical node of the mesh network 300 that performs a vital function, and a routing topology may be determined for the mesh network 300 that performs routing through routes B, C, E, and F. Using such a routing topology, nodes 305, 325, and 345 may operate as routing nodes. By performing routing using such a routing topology, routing through node 315 that is associated with a lock and routing through node 335 associated with a thermostat may be avoided, based on identifying that these nodes perform critical operations in the system and operate only on battery power, respectively.

Figure 4:
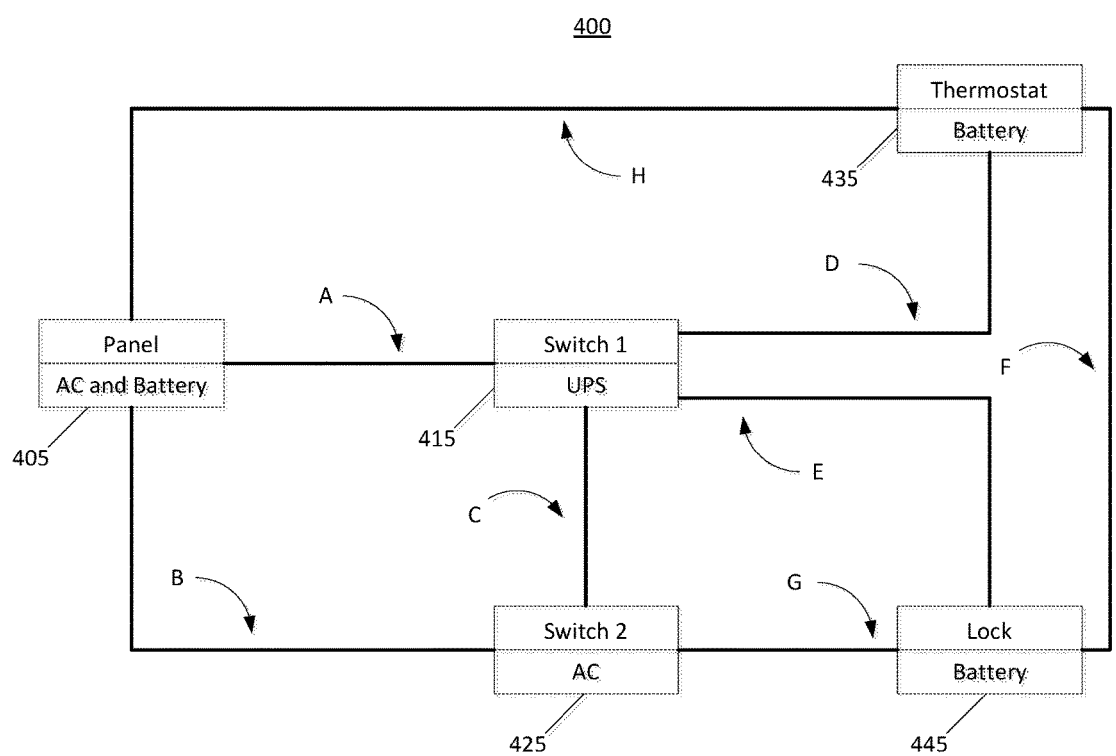

FIG. 4 illustrates an example routing implementation of a mesh network 400, in which the mesh network 400 may be related to a system for home monitoring or home automation. In some examples, the mesh network 400 of FIG. 4 can feature a routed network of nodes comprising nodes associated with a home monitoring or home automation control panel 405, a first switch 415, a second switch 425, a thermostat 435, and a lock 445. The node 405 associated with a control panel may feature an AC power source with battery backup, the node 415 associated with a first switch may feature an AC power source with an external uninterruptable power supply, the node 425 associated with a second switch may feature only an AC power source, the node 435 associated with a thermostat may feature only a battery power source, and the node 445 associated with a lock may feature only a battery power source. Based on the example mesh network 400, routing topologies addressing mesh network resiliency may be determined. For example, routing topologies for the mesh network 400 may enable the control panel associated with the node 405 to communicate with one or more of the nodes 415, 425, 435, and/or 445.

For example, mesh network 400 may be programmed with a set of two routing topologies and may be capable of determining the power state of mesh network 400. In this example, mesh network 400 may be programmed in such a way that, when AC power is available to the mesh network 400, routing in mesh network 400 may occur through nodes 405, 415, and 425. In this instance, the routing of mesh network 400 may be selected in order to minimize battery power usage at nodes 435 and 445, since both of these nodes may be associated with components identified as critical components, for example, a lock and/or a thermostat. Additionally, the example mesh network 400 may be programmed in such a way that, when the mesh network 400 determines that AC power is not available, routing in mesh network 400 may occur using nodes 405 and 415 or alternatively using another routing topology that utilizes critical nodes 435 or 445 as routing nodes, for example, through nodes 405, 415, and 435. Since node 425 associated with a second switch is only AC powered, this node will not be active when the mesh network 400 is in a state in which AC power is not available. In some examples. routing using battery powered nodes 435 and/or 445 that are identified as critical nodes is still avoided when AC power is not available, in order to minimize power usage at nodes of the mesh network 400 that are identified as critical nodes.

According to another implementation, mesh network 400 may be capable of dynamically rediscovering potential mesh network topologies upon detecting a change of the power state of the mesh network 400. For example, mesh network 400 may be routed using any number of topologies while mesh network 400 is in a system state in which AC power is available. For example, mesh network 400 may have AC power available and may be routed through nodes 405, 415, and 425 and through routes A, B, H, and G, or may be routed in another way. Upon determining that the mesh network 400 has entered a state in which AC power is not available, the mesh network 400 may dynamically reroute the mesh network 400. For example, a rediscovery process initialized based on determining that AC power is no longer available may determine that node 405 associated with a control panel is a possible routing node since it is equipped with a backup battery power source and that node 415 is a possible routing node since it is equipped with an external uninterruptable power supply. Based on determining that the nodes 405 and 415 are potential routing nodes, the mesh network 400 may utilize nodes 405 and/or 415 to route data from node 435 to node 445, for example, by routing data from node 435 to node 445 through data routes D and E, or data routes H, A, and E.

According to some implementations, mesh network 400 may determine that an AC power failure has occurred based on messages transmitted by one or more of the nodes of mesh network 400 and a voting process. For example, when a power failure event occurs, node 405 may transmit a message indicating that a power failure may have taken place. In response to this message, the node 415 associated with a first switch may transmit a message reporting that a power failure has not occurred, since the node is equipped with an external uninterruptable power supply and thus will not detect the power failure. However, node 425 associated with a second switch and equipped only with an AC power source will not be functional if a power failure event occurs, and thus will not transmit any messages in response to the message transmitted by node 405. Using a voting process, the mesh network 400 may determine that a power failure event has occurred based on node 425 not responding to the message reporting the power failure and based on the node 415 featuring an external uninterruptable power supply reporting that a power failure event has not occurred. In response to determining that an AC power failure has occurred, a rediscovery process may be initialized that dynamically determines an alternative routing topology for mesh network 400 by coordinating messages to all of the nodes of the mesh network 400, identifying which nodes are operational, and defining a routing topology that maximizes communication within the mesh network 400 while minimizing routing through critical nodes.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method for providing mesh network resiliency comprising:
providing, to one or more first nodes of a mesh network associated with a monitoring or automation system located in a property, routing data that indicates routing responsibilities for the one or more first nodes within a first routing configuration for the mesh network, wherein the one or more first nodes of the mesh network are associated with one or more sensors that sense attributes of the property or one or more devices that perform automated functionality for the property, and the first routing configuration being appropriate at a time during which a first power source that powers multiple nodes of the mesh network is available;
designating a particular node of the one or more first nodes of the mesh network as a coordinator node, wherein the particular node designated as the coordinator node is capable of detecting an interruption of the first power source and features a second power source that is different than the first power source;
detecting, by the particular node designated as the coordinator node, an interruption of the first power source for the mesh network;
determining a second routing configuration for one or more second nodes of the mesh network that include the particular node designated as the coordinator node, the second routing configuration being appropriate at a time during which the first power source that powers multiple nodes of the mesh network is unavailable;
providing, to the one or more second nodes of the mesh network, routing data that indicates routing responsibilities for the one or more second nodes within the second routing configuration for the mesh network, wherein each of the one or more second nodes of the mesh network include a second power source that is different than the first power source; and
providing, by the particular node designated as the coordinator node and in response to the particular node designated as the coordinator node detecting the interruption of the first power source for the mesh network, one or more messages to the one or more second nodes of the mesh network indicating the interruption of the first power source for the mesh network, wherein receipt of a message from the particular node designated as the coordinator node indicating the interruption of the first power source for the mesh network causes the one or more second nodes of the mesh network to route data according to the second routing configuration for the mesh network.

2. The method of claim 1, wherein the first routing configuration for the mesh network and the second routing configuration for the mesh network are each one of a Z-Wave network, a ZigBee network, an IPv6 over Low Power Wireless Personal Area Network (6LoWPAN), a Bluetooth network, or an INSTEON network.

3. The method of claim 1, wherein:
detecting the interruption of the first power source for the mesh network comprises detecting, by the particular node designated as the coordinator node, an interruption of an alternating current (AC) power source for the mesh network; and
determining the second routing configuration for the one or more second nodes of the mesh network comprises determining a second routing configuration for one or more nodes of the mesh network that each include at least one of a battery power source or an external uninterruptable power supply power source.

4. The method of claim 1, wherein determining the second routing configuration for the one or more second nodes of the mesh network comprises:
identifying one or more nodes of the mesh network that include a second power source that is different than the first power source;
determining data routing paths for the one or more nodes of the mesh network that include a second power source that is different than the first power source, wherein the data routing paths for the one or more nodes of the mesh network that include a second power source that is different than the first power source each include one or more nodes of the mesh network that include a second power source that is different than the first power source; and
storing the data routing paths for the one or more nodes of the mesh network that include a second power source that is different than the first power source in a routing table.

5. The method of claim 1, wherein:
providing the routing data that indicates routing responsibilities for the one or more first nodes within the first routing configuration for the mesh network comprises providing a first routing table to the one or more first nodes of the mesh network; and
providing the routing data that indicates routing responsibilities for the one or more second nodes within the second routing configuration for the mesh network comprises providing a second routing table to the one or more second nodes of the mesh network.

6. The method of claim 1, wherein at least one of the one or more first nodes of the mesh network is identified as a critical node and at least one of the one or more first nodes of the mesh network is identified as a routing node, wherein routing nodes are nodes responsible for routing data in the mesh network within the first routing configuration, and wherein any of the one or more first nodes of the mesh network that is identified as a critical node is not also identified as a routing node.

7. The method of claim 1, wherein at least one of the one or more second nodes of the mesh network is identified as a critical node and at least one of the one or more second nodes of the mesh network is identified as a routing node, wherein routing nodes are nodes responsible for routing data in the mesh network within the second routing configuration, and wherein any of the one or more second nodes of the mesh network that is identified as a critical node is not also identified as a routing node.

8. The method of claim 7, comprising:
determining that the second routing configuration for the mesh network results in a disjointed mesh network;
based on the determination that the second routing configuration for the mesh network results in a disjointed mesh network, identifying one or more of the at least one critical nodes that enable a fully jointed mesh network if used as routing nodes;
updating the second routing configuration to include the identified one or more of the at least one critical nodes as routing nodes; and
providing, to the one or more second nodes of the mesh network, routing data that indicates routing responsibilities for the one or more second nodes within the updated second routing configuration for the mesh network.

9. The method of claim 1, comprising:
detecting, by the particular node designated as the coordinator node, an interruption of the second power source at a particular one of the one or more second nodes of the mesh network;
determining, in response to detecting the interruption of the second power source at the particular one of the one or more second nodes of the mesh network, a third routing configuration for one or more third nodes of the mesh network that include the particular node designated as the coordinator node, the second routing configuration not including the particular one of the one or more second nodes of the mesh network; and
providing, to the one or more third nodes of the mesh network, routing data that indicates routing responsibilities for the one or more third nodes within the third routing configuration for the mesh network.

10. A system comprising:
at least one processor; and
at least one memory coupled to the at least one processor having stored thereon instructions which, when executed by the at least one processor, causes the at least one processor to perform operations comprising:
providing, to one or more first nodes of a mesh network associated with a monitoring or automation system located in a property, routing data that indicates routing responsibilities for the one or more first nodes within a first routing configuration for the mesh network, wherein the one or more first nodes of the mesh network are associated with one or more sensors that sense attributes of the property or one or more devices that perform automated functionality for the property, and the first routing configuration being appropriate at a time during which a first power source that powers multiple nodes of the mesh network is available;
designating a particular node of the one or more first nodes of the mesh network as a coordinator node, wherein the particular node designated as the coordinator node is capable of detecting an interruption of the first power source and features a second power source that is different than the first power source;
detecting, by the particular node designated as the coordinator node, an interruption of the first power source for the mesh network;
determining a second routing configuration for one or more second nodes of the mesh network that include the particular node designated as the coordinator node, the second routing configuration being appropriate at a time during which the first power source that powers multiple nodes of the mesh network is unavailable;
providing, to the one or more second nodes of the mesh network, routing data that indicates routing responsibilities for the one or more second nodes within the second routing configuration for the mesh network, wherein each of the one or more second nodes of the mesh network include a second power source that is different than the first power source; and
providing, by the particular node designated as the coordinator node and in response to the particular node designated as the coordinator node detecting the interruption of the first power source for the mesh network, one or more messages to the one or more second nodes of the mesh network indicating the interruption of the first power source for the mesh network, wherein receipt of a message from the particular node designated as the coordinator node indicating the interruption of the first power source for the mesh network causes the one or more second nodes of the mesh network to route data according to the second routing configuration for the mesh network.

11. A method for providing mesh network resiliency comprising:
determining a first routing configuration for one or more nodes of a mesh network associated with a monitoring or automation system located in a property, the one or more nodes of the mesh network being associated with one or more sensors that sense attributes of the property and one or more devices that perform automated functionality for the property, and the first routing configuration being appropriate at a time during which a first power source that powers multiple nodes of the mesh network is available;
providing, to one or more first nodes of the mesh network, routing data that indicates routing responsibilities within the first routing configuration for the mesh network;
detecting, by one or more nodes of the mesh network, an interruption of the first power source for the mesh network;
determining, in response to detecting the interruption of the first power source for the mesh network, a second routing configuration for nodes of the mesh network, the second routing configuration being appropriate at a time during which the first power source that powers multiple nodes of the mesh network is unavailable;
providing, to one or more second nodes of the mesh network, routing data that indicates routing responsibilities within the second routing configuration for the mesh network, each of the one or more second nodes including a second power source that is different than the first power source;
detecting, for a particular node of the one or more second nodes of the mesh network, an interruption of the second power source that is different than the first power source; and
in response to detecting the interruption of the second power source for the particular node, preventing transmission of messages to the particular node according to the second routing configuration.

12. The method of claim 11, wherein the first routing configuration for the mesh network and the second routing configuration for the mesh network are each one of a Z-Wave network, a ZigBee network, an IPv6 over Low Power Wireless Personal Area Network (6LoWPAN), a Bluetooth network, or an INSTEON network.

13. The method of claim 11, wherein:
detecting the interruption of the first power source for the mesh network comprises detecting, by one or more nodes of the mesh network, an interruption of an alternating current (AC) power source for the mesh network; and
determining the second routing configuration for the mesh network comprises detecting a second routing configuration for nodes of the mesh network that each include at least one of a battery power source or an external uninterruptable power supply power.

14. The method of claim 11, wherein determining the second routing configuration for the mesh network comprises:
identifying one or more nodes of the mesh network that include a second power source that is different than the first power source;
determining data routing paths for the one or more nodes of the mesh network that include a second power source that is different than the first power source, wherein the data routing paths for the one or more nodes of the mesh network that include a second power source that is different than the first power source each include one or more nodes of the mesh network that include a second power source that is different than the first power source; and
storing the data routing paths for the one or more nodes of the mesh network that include a second power source that is different than the first power source in a routing table.

15. The method of claim 11, wherein:
providing the routing data that indicates routing responsibilities within the first routing configuration for the mesh network to the one or more first nodes of the mesh network comprises providing a first routing table to the one or more first nodes of the mesh network; and
providing the routing data that indicates routing responsibilities within the second routing configuration for the mesh network to the one or more second nodes of the mesh network comprises providing a second routing table to the one or more second nodes of the mesh network.

16. The method of claim 11, comprising:
determining that preventing transmission of messages to the particular node according to the second routing configuration results in a disjointed mesh network;
based on the determination that preventing transmission of messages to the particular node according to the second configuration results in a disjointed mesh network, identifying one or more of the second nodes of the mesh network that enable a fully jointed mesh network if used as routing nodes, wherein routing nodes are nodes responsible for routing data in the mesh network;
updating the second routing configuration to include the identified one or more of the second nodes of the mesh network as routing nodes; and
providing, to the one or more second nodes of the mesh network, routing data that indicates routing responsibilities for the one or more second nodes of the mesh network within the updated second routing configuration for the mesh network.

17. The method of claim 11, comprising:
determining, in response to detecting the interruption of the second power source that is different than the first power source for the particular node of the one or more second nodes of the mesh network, a third routing configuration for nodes of the mesh network, the third routing configuration being appropriate at a time during which the first power source that powers multiple nodes of the mesh network is unavailable and the second power source that is different than the first power source is unavailable for the particular node; and
providing, to one or more third nodes of the mesh network, routing data that indicates routing responsibilities within the third routing configuration of the mesh network, each of the one or more third nodes including the second power source that is different than the first power source.

18. The method of claim 11, wherein detecting the interruption of the first power source for the mesh network comprises:
identifying one or more nodes of the mesh network as coordinator nodes; and
detecting the interruption of the first power source for the mesh network by one or more of the coordinator nodes.

19. The method of claim 11, wherein detecting the interruption of the first power source for the mesh network comprises:
receiving, from each of one or more nodes of the mesh network, a vote indicating whether the node of the mesh network has detected an interruption of the first power source for the mesh network; and
detecting the interruption of the first power source for the mesh network based on the votes received from the one or more nodes of the mesh network each indicate whether a node of the mesh network has detected an interruption of the first power source for the mesh network.

20. A system comprising:
at least one processor; and
at least one memory coupled to the at least one processor having stored thereon instructions which, when executed by the at least one processor, causes the at least one processor to perform operations comprising:
determining a first routing configuration for one or more nodes of a mesh network associated with a monitoring or automation system located in a property, the one or more nodes of the mesh network being associated with one or more sensors that sense attributes of the property and one or more devices that perform automated functionality for the property, and the first routing configuration being appropriate at a time during which a first power source that powers multiple nodes of the mesh network is available;
providing, to one or more first nodes of the mesh network, routing data that indicates routing responsibilities within the first routing configuration for the mesh network;
detecting, by one or more nodes of the mesh network, an interruption of the first power source for the mesh network;
determining, in response to detecting the interruption of the first power source for the mesh network, a second routing configuration for nodes of the mesh network, the second routing configuration being appropriate at a time during which the first power source that powers multiple nodes of the mesh network is unavailable;

providing, to one or more second nodes of the mesh network, routing data that indicates routing responsibilities within the second routing configuration for the mesh network, each of the one or more second nodes including a second power source that is different than the first power source;

detecting, for a particular node of the one or more second nodes of the mesh network, an interruption of the second power source that is different than the first power source; and in response to detecting the interruption of the second power source for the particular node, preventing transmission of messages to the particular node according to the second routing configuration.

\* \* \* \* \*